(12) United States Patent
Stenzenberger et al.

(10) Patent No.: US 9,446,642 B2
(45) Date of Patent: Sep. 20, 2016

(54) REAR AXLE OF A TWO-TRACK VEHICLE

(71) Applicant: Bayerische Motoren Werke Aktiengesellschaft, Munich (DE)

(72) Inventors: Alfred Stenzenberger, Fuenfstetten (DE); Johann Kettenberger, Winhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/826,294

(22) Filed: Aug. 14, 2015

(65) Prior Publication Data

US 2015/0343868 A1 Dec. 3, 2015

Related U.S. Application Data

(63) Continuation of application No. PCT/EP2014/050924, filed on Jan. 17, 2014.

(30) Foreign Application Priority Data

Feb. 15, 2013 (DE) .......................... 10 2013 202 527

(51) Int. Cl.
| | |
|---|---|
| *B60G 11/04* | (2006.01) |
| *B60G 3/20* | (2006.01) |
| *B60G 3/28* | (2006.01) |
| *B60G 7/00* | (2006.01) |
| *B60G 11/14* | (2006.01) |
| *B62D 7/14* | (2006.01) |

(52) U.S. Cl.
CPC ............... *B60G 3/285* (2013.01); *B60G 7/006* (2013.01); *B60G 11/14* (2013.01); *B62D 7/146* (2013.01);
(Continued)

(58) Field of Classification Search
CPC ............ B60G 11/14; B60G 2204/129; B60G 2204/124; B60G 2204/148; B60G 2200/182; B60G 3/202; B60G 3/20
USPC .................................................. 280/124.128
See application file for complete search history.

(56) References Cited

U.S. PATENT DOCUMENTS 4,790,560 A * 12/1988 Asanuma ................. B60G 3/22
280/124.128
5,895,063 A * 4/1999 Hasshi ..................... B60G 3/18
280/124.125

(Continued)

FOREIGN PATENT DOCUMENTS

| EP | 0 136 563 A2 | 4/1985 |
| EP | 0 136 563 B2 | 4/1994 |

(Continued)

OTHER PUBLICATIONS

International Search Report (PCT/ISA/210) dated Feb. 25, 2014, with English translation (six (6) pages).

*Primary Examiner* — Keith Frisby
(74) *Attorney, Agent, or Firm* — Crowell & Moring LLP

(57) ABSTRACT

A rear axle of a two-track vehicle, including three control arms articulated to a wheel carrier and extending substantially in a transverse direction of the vehicle, and a trailing arm rigidly connected to the wheel carrier and having adequate flexibility in the transverse direction of the vehicle due to its structure or its mounting on the vehicle body. A support spring proportionately supporting the vehicle body with respect to the wheel and a vibration damper connected effectively in parallel with the supporting spring are supported on the wheel carrier without the intermediate arrangement of a control arm articulated to the wheel carrier. The support spring is supported in front of the wheel center and below the wheel center, as viewed in the direction of travel, on a cantilever protruding from the wheel carrier toward the vehicle center plane and the control arm articulated to the wheel carrier above the center point of the driven wheel in the vertical direction is connected to the wheel carrier behind the wheel center as viewed in the direction of travel. The control arm articulated to the wheel carrier in front of the wheel center as viewed in the direction of travel is connected to the wheel carrier below the wheel center in the vertical direction. The control arm arranged farthest to the rear as viewed in the direction of travel is connected to a steering actuator for the wheel by its end facing away from the wheel carrier.

1 Claim, 3 Drawing Sheets

(52) U.S. Cl.
CPC . *B60G 2200/182* (2013.01); *B60G 2200/4622* (2013.01); *B60G 2204/124* (2013.01); *B60G 2204/129* (2013.01); *B60G 2204/148* (2013.01); *B60G 2204/62* (2013.01)

(56) References Cited

U.S. PATENT DOCUMENTS

| 7,401,797 B2 * | 7/2008 | Cho | B60G 7/02 267/188 |
|---|---|---|---|
| 2007/0001420 A1 | 1/2007 | Schmidt et al. | |
| 2010/0102527 A1 * | 4/2010 | Yanagida | B60G 3/20 280/124.135 |
| 2010/0289229 A1 * | 11/2010 | Post, II | F16F 9/466 280/5.524 |

FOREIGN PATENT DOCUMENTS

| EP | 1 738 939 A2 | 1/2007 |
| FR | 2 832 097 A1 | 5/2003 |
| FR | 2 914 586 A1 | 10/2008 |
| JP | 62-18309 A | 1/1987 |

* cited by examiner

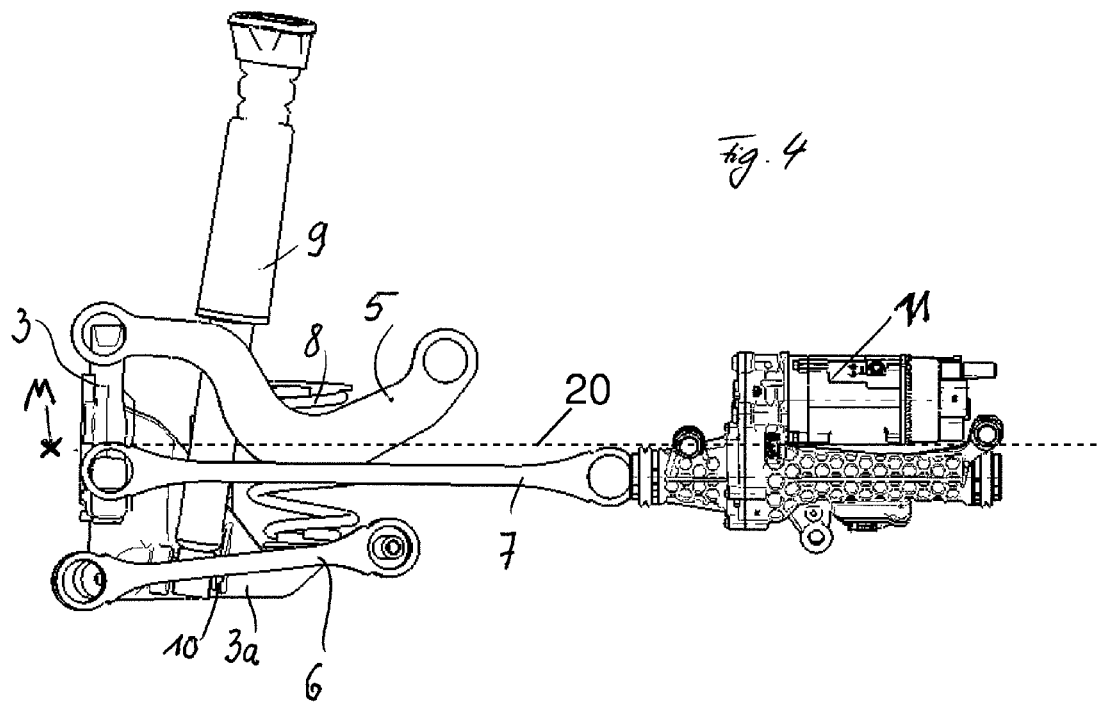
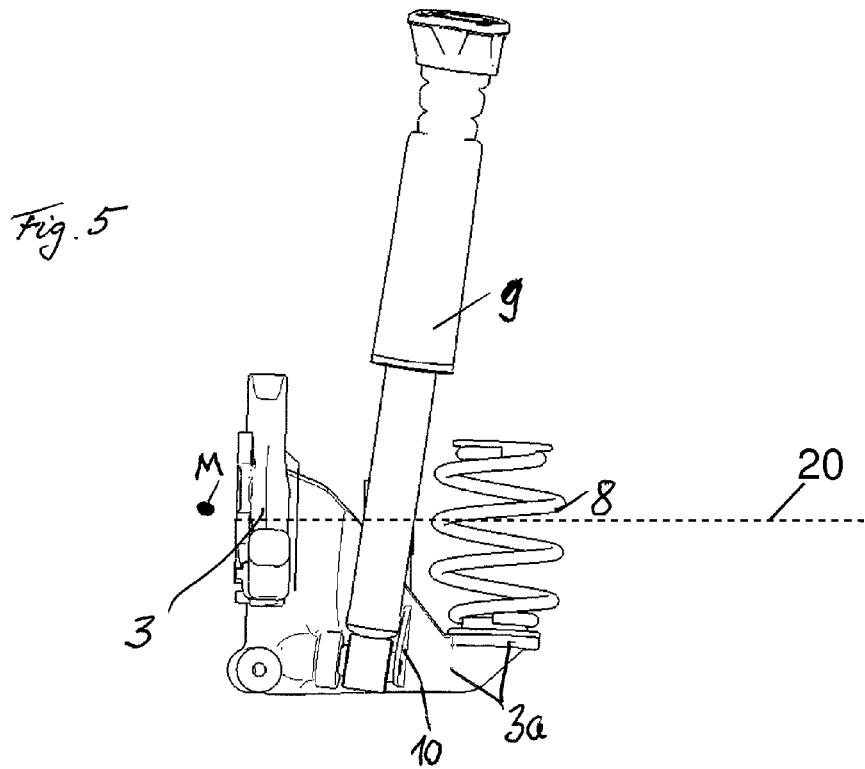

REAR AXLE OF A TWO-TRACK VEHICLE

CROSS REFERENCE TO RELATED APPLICATIONS

This application is a continuation of PCT International Application No. PCT/EP2014/050924, filed Jan. 17, 2014, which claims priority under 35 U.S.C. §119 from German Patent Application No. 10 2013 202 527.0, filed Feb. 15, 2013, the entire disclosures of which are herein expressly incorporated by reference.

BACKGROUND AND SUMMARY OF THE INVENTION

The invention relates to a rear axle of a two-track vehicle with three control arms which are connected in an articulated manner to a wheel carrier and extend substantially in the vehicle transverse direction, and a trailing arm which is connected rigidly to the wheel carrier and has sufficient flexibility in the vehicle transverse direction as a result of its structure or its vehicle body-side mounting. A support spring which proportionally supports the vehicle body with respect to a wheel which is mounted rotatably on the wheel carrier and a vibration damper which is connected in parallel in terms of action to the support spring are supported below the wheel center on a cantilever which protrudes from the wheel carrier toward the vehicle center plane. FR 2 914 586 A1 discloses a rear axle having the above features. Furthermore, with respect to prior art, reference is made to JP 62-18309 and EP 0 136 563 B2.

The axle construction shown in EP 0 136 563 B2 is also called a control blade axle, which construction is more favorable with regard to the force conditions in the context of the support of the vehicle body than many other control blade axles which are currently in series production, since both the support (suspension) spring and the vibration damper are supported directly on the wheel carrier in EP 0 136 563 B2. Neither the control arms nor their joints are therefore loaded with the weight of the vehicle body and a functionally favorable rate can be produced in any case for the damper. However, the installation space requirement of this known construction is relatively high, in particular as viewed in the vertical direction, with the result that an improvement is desired not only in this regard, but rather also a favorable rear-axle design which has a high mechanical load capacity is sought in which the wheel is not only driven, but rather can also be steered, at least slightly. FR 2 914 586 A1 which was mentioned in the introduction also cannot offer any suggestion in this respect.

The present invention solves these problems in a vehicle rear axle of a two-track vehicle. As viewed in the driving direction, the support spring is supported in front of the wheel center and below the wheel center on a cantilever which protrudes from the wheel carrier toward the vehicle center plane to such an extent that a drive shaft, which runs as customary in the vehicle transverse direction, is located behind the support spring. By way of a suggested low arrangement, the support spring can be arranged practically completely below a body longitudinal carrier of the vehicle body in conjunction with a compact design of the support spring which arises from a spring rate which can be produced in the order of magnitude from 0.7 to 0.8, resulting from the support on a cantilever which protrudes toward the vehicle center plane. In the case of a passenger car, therefore, an extremely wide and low-lying trunk floor can be produced.

Furthermore, the control arm which is articulated on the wheel carrier above the center point of the driven wheel in the vertical direction is connected to the wheel carrier behind the wheel center as viewed in the driving direction, and the control arm which is articulated on the wheel carrier in front of the wheel center as viewed in the driving direction is connected to the wheel carrier below the wheel center in the vertical direction. A favorably running steering axis for the wheel is described by way of these articulation points, with the result that finally the control arm which is arranged furthest to the rear as viewed in the driving direction is connected by way of its end which faces away from the wheel carrier to a steering actuator for the wheel and, therefore, acts as a toe link.

Furthermore, the vibration damper is also supported on the cantilever—preferably further to the outside than the support spring—and the trailing arm is fastened to the cantilever. In this way, not only a rigid assembly, but rather also a favorable introduction of the additional spring force from the damper can be produced. A receptacle bracket for the (lower) damper bearing is provided, as it were, as a direct extension of the trailing arm, which extension passes through the cantilever, and therefore provides additional reinforcement of this assembly of trailing arm and cantilever or wheel carrier.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 is a view from the rear as viewed in the driving direction of the vehicle; and FIG. 5 is, in the same view from the rear, showing only the articulation of the damper on the wheel carrier or on its cantilever.

DETAILED DESCRIPTION OF THE DRAWINGS

Figure 1:
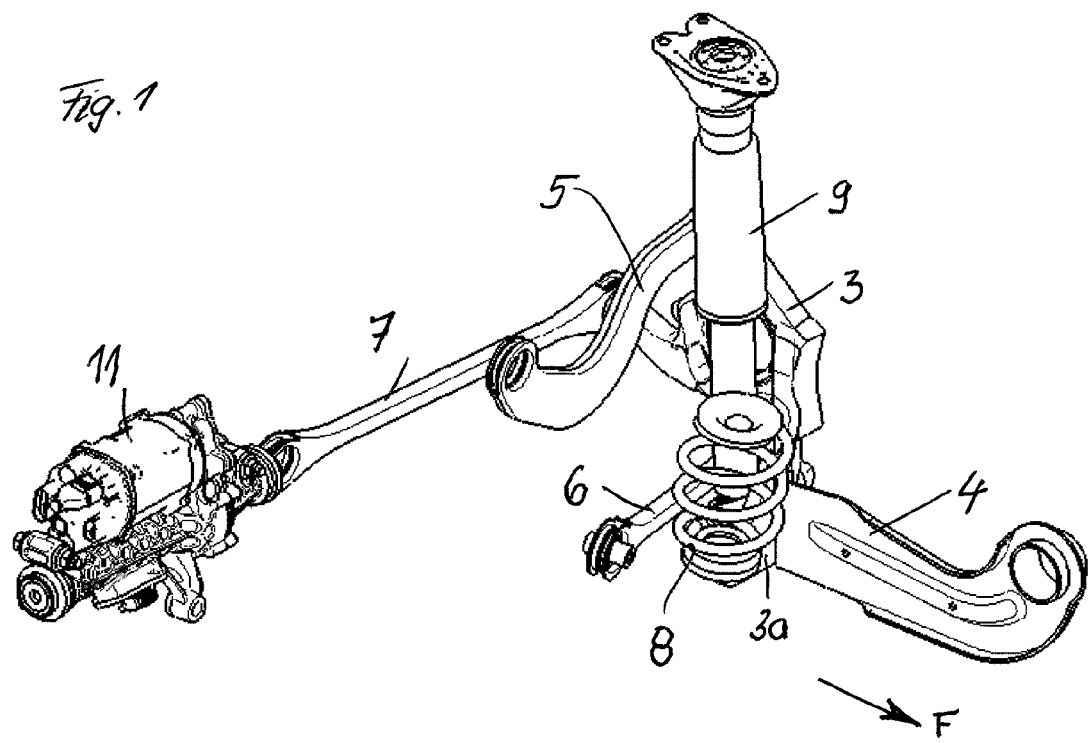
FIG. 1 is a three-dimensional illustration of the suspension of the driven and slightly steerable left-hand rear wheel of a passenger car.
Figure 2:
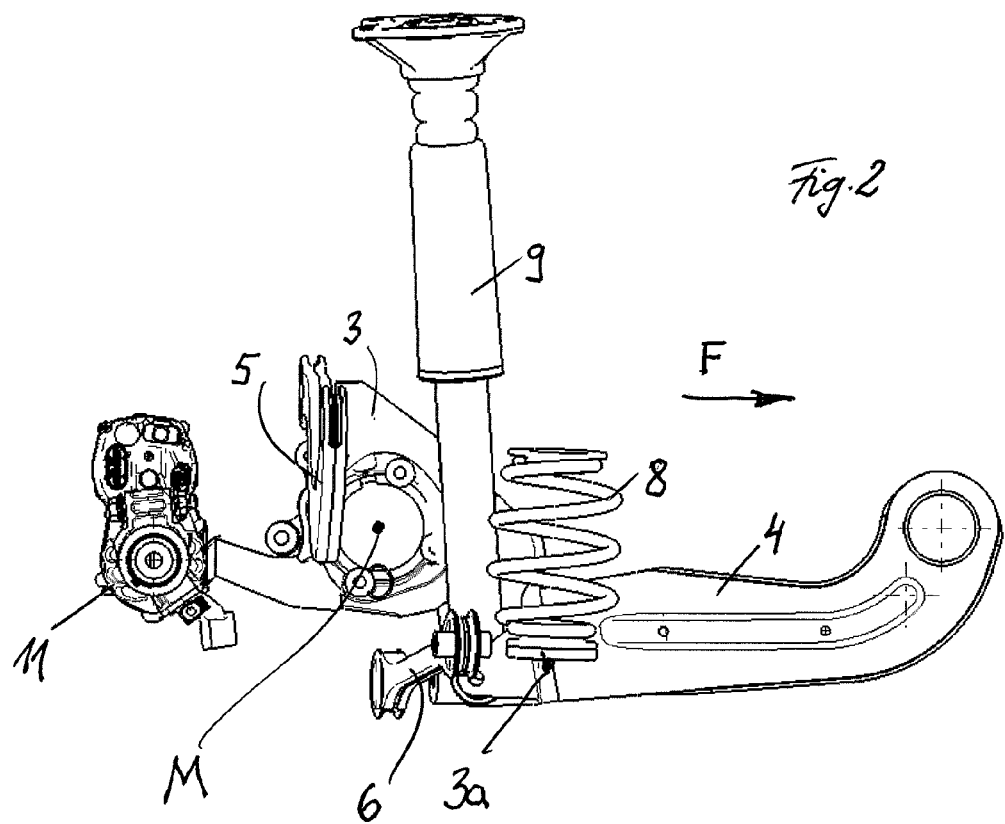
FIG. 2 is a side view from an inner side of the vehicle.

The left-hand rear wheel (not shown) with the center point M (cf. FIGS. 2, 4) can be driven by a drive shaft (shown schematically by dash line 20 in FIGS. 4 and 5) which lies horizontally as customary substantially in the vehicle transverse direction, and is guided via its wheel carrier 3 by way of a total of four links 4, 5, 6, 7. The four links 4, 5, 6, 7 are connected either directly or, with a rear axle support (not shown) being connected in between, indirectly, to the vehicle body (likewise not shown) by way of their ends which face away from the wheel carrier 3. Via a support (suspension) spring 8, to which a vibration damper 9 is connected in parallel in terms of action, the vehicle body is supported proportionally on the wheel carrier 3 (or the wheel which is mounted rotatably on the latter).

As can be seen, the support spring 8 is supported practically directly on the wheel carrier 3 or on the trailing arm 4 which is connected rigidly to the wheel carrier 3. The trailing arm leads away from a cantilever 3a, which cantilever 3a protrudes toward the vehicle center from the wheel carrier 3 and has has a disc-like shape. On the free end of the cantilever 3a, the support spring 8 is supported, as will still be explained further in the following text and is most clearly apparent from FIG. 5. In this way, none of the control arms 5, 6, 7 which are connected to the wheel carrier 3 in an articulated manner is loaded by way of the force of said support spring 8. The control arm 7 which is arranged furthest to the rear as viewed in the driving direction F can advantageously therefore be arranged such that it is situated in a position which is favorable for what is known as a toe link, which determines the toe and therefore the steering angle of the at least slightly steerable wheel, i.e. it namely runs substantially in the vehicle transverse direction with as great a length as possible substantially at the level of the wheel center M. In this way, a differential (not shown) for the drive shaft can be suspended favorably in an abovementioned axle support, and the steering actuator 11 which actuates the toe link/control arm 7 can also be attached to the axle support.

Figure 3:
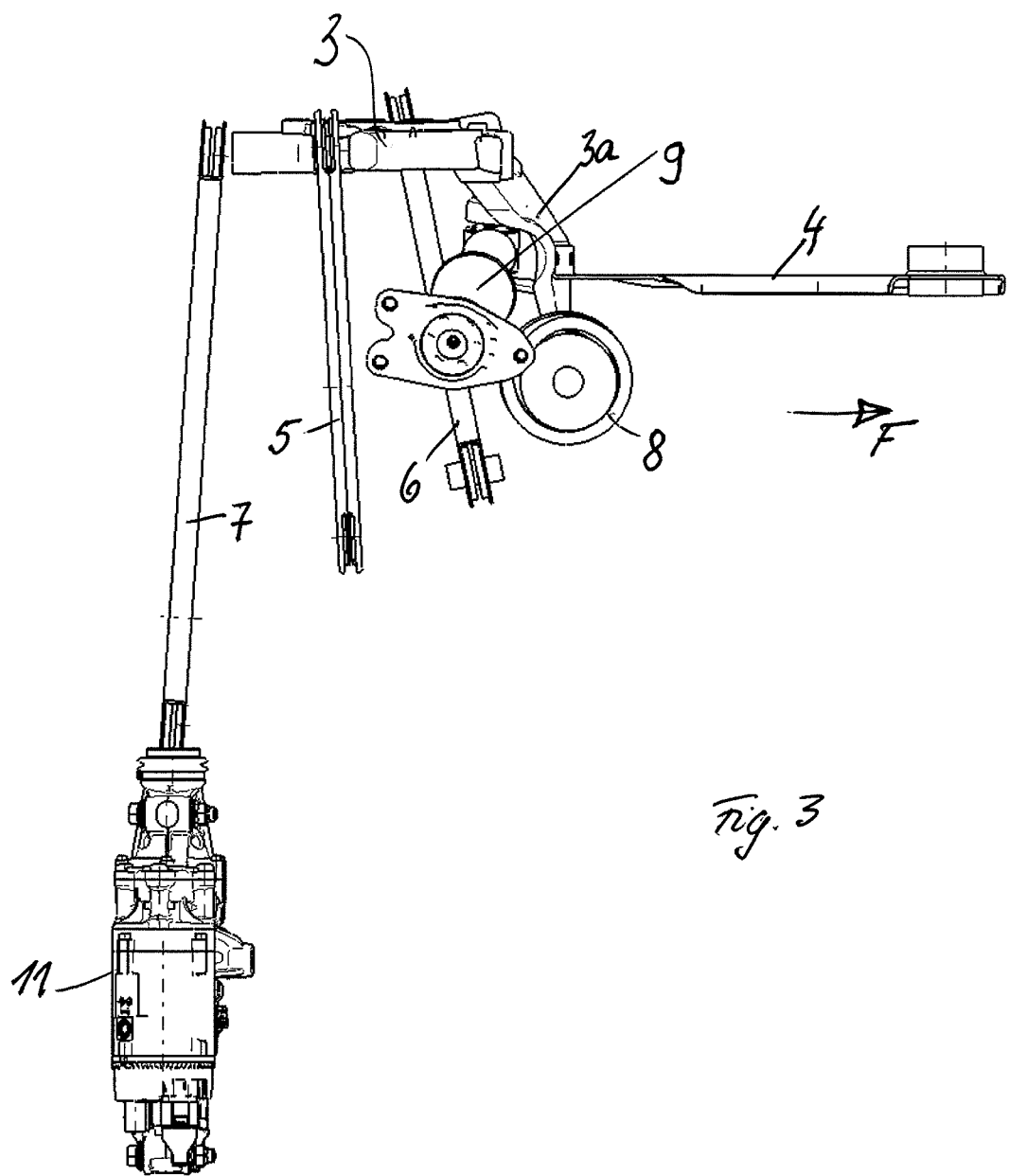
FIG. 3 is a view in the vertical direction as viewed from above.

For the support of the support spring 8 on the wheel carrier 3, a rigid cantilever 3a is provided. The cantilever 3a extends at a relatively low height toward the vehicle center plane as viewed in the vehicle transverse direction from its "basic structure" as a substantially disk-shaped structure, on the free end of which cantilever 3a the support spring 8 is supported. By the support of the support spring 8 therefore being spaced apart by a sufficient distance from the wheel center plane, a support spring 8 of extremely compact design with a low overall height can be used on account of the spring rate in the range between 0.7 and 0.8. By virtue of the fact that the cantilever 3a is provided as far as possible below the wheel center M (approximately 150 mm above the roadway) with consideration for the required ground clearance of the vehicle, the support spring 8 can come to lie below a body longitudinal carrier (not shown). This results in advantages for the vehicle topology and the luggage space volume of the vehicle. The line of action of the support spring 8 is oriented substantially vertically, and the cantilever 3a is also utilized for the attachment of the trailing arm 4 and the damper 9. As is apparent from FIG. 3, in particular, the trailing arm 4 emanates namely from the cantilever 3a of the wheel carrier 3 (and therefore not directly from the approximately disk-shaped wheel carrier 3 itself).

Just like the support spring 8, the vibration damper 9 is also supported via the cantilever 3a ultimately on the wheel carrier 3, in order to relieve the control arms 5 to 7 of the forces of the vibration damper 9. Here, an arrangement is provided with a damper positioned in front of the wheel center M as viewed in the driving direction F and a rate of approximately 0.9. As a result of the lower rate, this arrangement provides a shorter damper length, which is advantageous for various body concepts. In order, in the case of relatively long suspension travel, to keep the camber moments low which are produced as a result of the force of an additional spring which is usually provided in the damper 9, the damper 9 is arranged with its upper end at a slight inclination toward the vehicle center plane (cf. FIG. 4) and is inclined in the process such that its extended line of action strikes the roadway within the wheel contact point with as small a spacing as possible (in the order of magnitude of 150 mm) from the latter.

Using the exemplary embodiment shown, a compact two-sided damper attachment to the cantilever 3a of the wheel carrier is shown, as is apparent from FIG. 5, in particular. Here, an inner receptacle bracket 10 for the lower damper bearing is arranged as it were as a direct extension of the trailing arm 4, which extension passes through the cantilever 3a, and therefore provides additional reinforcement of this assembly of trailing arm 4 and cantilever 3a or wheel carrier 3.

It has already been mentioned that the control arm 7 which acts as a toe link is designed to be as long as possible (in the order of magnitude of 500 mm in the present case), in order that its, in particular, wheel carrier-side bearing is loaded torsionally as little as possible and therefore a transverse movement of the axle which is as little as possible takes place during compression and rebound. The length of the further control arms 5, 6 depends on the length of the toe link 7. In the link arrangement which is shown here, a ratio of from approximately 3 to 5 results in a favorable profile of the toe curves over the wheel travel. This results in a length of approximately 300 mm for the two control arms 5, 6, and the upper control arm 5 and the lower control arm 6 are arranged in such a way that their (substantially customary) functional aims are met as far as possible, namely that satisfactory kinematics (as profile of the toe and camber characteristic curves over the wheel travel) and satisfactory elastokinematics (driving stability in the case of longitudinal and transverse dynamics) and sensible steering forces and steering angles for slight steering of the wheel 1 are set. Here, the connecting line of the two wheel carrier-side articulation points of the control arms 5, 6 forms the steering axis for the rear-wheel steering system. The spacing from the wheel carrier-side toe link articulation point results in the steering arm, on the length of which the actuating force to be applied by the steering actuator 11 and the required actuating travel depend. The preloads which are caused by the wheel loads in the bearings of all control arms 5, 6, 7 as a result of the selected link arrangement are also at a relatively low level.

In specific terms, the arrangement of the control arms 5, 6 is such that the wheel carrier-side articulation point of the upper (=lying above the wheel center M) control arm 5 which runs in a V-shaped manner to the front by approximately 3° lies approximately 57 mm behind the wheel center M. The wheel carrier-side articulation point of the lower (=lying below the wheel center M) control arm 6 which runs in a V-shaped manner to the front by approximately 12° lies approximately 12 mm in front of the wheel center M. The vertical position of the control arms 5, 6 depends, in particular, on the installation space conditions in the inner rim of the wheel. For the exemplary embodiment which is shown here, a spacing from the wheel center M of approximately 118 mm results for the wheel carrier-side articulation of the upper control arm 5 and a wheel center spacing of approximately 135 mm results for that of the lower control arm. The upper control arm 5 runs in a V-shaped manner to the bottom by approximately 3° and the lower control arm 6 runs in a V-shaped toward the top by approximately 8°.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rear axle of a two-track vehicle having a vehicle body, comprising:
   a wheel carrier;
   three control arms connected in an articulated manner to the wheel carrier and extending substantially in a vehicle transverse direction;
   a trailing arm connected rigidly to the wheel carrier;

a support spring configured to proportionally support the vehicle body with respect to a wheel mounted rotatably on the wheel carrier;

a vibration damper connected to act in parallel with the support spring;

a cantilever extending from the wheel carrier toward a vehicle center plane, wherein the support spring and the vibration damper are supported below a wheel center on the cantilever without a link, which is connected in an articulated manner to the wheel carrier, being connected in between, a first of the three control arms articulated on the wheel carrier above the wheel center in a vertical direction is connected to the wheel carrier behind the wheel center viewed in a driving direction, the support spring is supported in front of the wheel center on the cantilever as viewed in the driving direction such that the wheel is drivable via a drive shaft extending in the vehicle transverse direction, a second of the three control arms articulated on the wheel carrier in front of the wheel center as viewed in the driving direction is connected to the wheel carrier below the wheel carrier in the vertical direction, a third of the three controls arm arranged furthest to a rear as viewed in the driving direction is connected at an end facing away from the wheel carrier to a steering actuator for the wheel, the trailing arm is fastened to the cantilever, and a receptacle bracket for a lower bearing of the vibration damper is formed as an extension of the trailing arm that would pass through the cantilever.

* * * * *